(12) United States Patent
Musk

(10) Patent No.: US 9,977,202 B2
(45) Date of Patent: May 22, 2018

(54) OPTICAL MULTICHANNEL TRANSMISSION AND/OR RECEPTION MODULE, IN PARTICULAR FOR HIGH-BITRATE DIGITAL OPTICAL SIGNALS

(71) Applicant: ADVA Optical Networking SE, Meiningen (DE)

(72) Inventor: Robert William Musk, Kingsbridge (GB)

(73) Assignee: ADVA Optical Networking SE, Meiningen (DE)

( * ) Notice: Subject to any disclaimer, the term of this patent is extended or adjusted under 35 U.S.C. 154(b) by 0 days. days.

(21) Appl. No.: 15/371,811

(22) Filed: Dec. 7, 2016

(65) Prior Publication Data

US 2017/0176699 A1  Jun. 22, 2017

(30) Foreign Application Priority Data

Dec. 16, 2015 (DE) .................... 20 2015 106 860 U
Dec. 16, 2015 (EP) ..................................... 15200503

(51) Int. Cl.
*H04B 10/00* (2013.01)
*G02B 6/42* (2006.01)
(Continued)

(52) U.S. Cl.
CPC ......... *G02B 6/4249* (2013.01); *G02B 6/4256* (2013.01); *G02B 6/4278* (2013.01);
(Continued)

(58) Field of Classification Search
CPC .. G02B 6/4249; G02B 6/4256; G02B 6/4281; G02B 6/4278; H04B 10/11; H04B 10/2581; H04B 10/40
(Continued)

(56) References Cited

U.S. PATENT DOCUMENTS 7,300,215 B2 * 11/2007 Hsiao .................. G02B 6/4201
385/139
7,917,037 B2 * 3/2011 Liu ...................... G02B 6/4277
398/135
(Continued)

FOREIGN PATENT DOCUMENTS

EP         2675025 A2   12/2013
WO    2015038941 A1    3/2015

*Primary Examiner* — Juan A Torres
(74) *Attorney, Agent, or Firm* — The Webb Law Firm

(57) ABSTRACT

Disclosed is an optical multichannel transmission and/or reception module, in particular for high-bitrate digital optical signals, with a housing having multiple optical input ports and/or optical output ports and containing an electric assembly and an essentially flat opto-electric module connected electrically to the electric assembly. Multiple electro-optic transmission elements and/or multiple opto-electric reception elements are located on or in the opto-electric module. The opto-electric module has an optical coupling area on one of its surfaces that is connected to the respective first ends of multiple optical waveguides. The opto-electric module has multiple optic paths for optical connection of each first end of an optic waveguide with an associated electro-optic transmission element and/or an associated opto-electric reception element.

13 Claims, 4 Drawing Sheets

(51) Int. Cl.
*H04B 10/2581* (2013.01)
*H04B 10/11* (2013.01)
*H04B 10/40* (2013.01)

(52) U.S. Cl.
CPC ........... *G02B 6/4281* (2013.01); *H04B 10/11* (2013.01); *H04B 10/2581* (2013.01); *H04B 10/40* (2013.01)

(58) Field of Classification Search
USPC ........................................................ 398/115
See application file for complete search history.

(56) References Cited

U.S. PATENT DOCUMENTS

| | | | |
|---|---|---|---|
| 2006/0274997 A1 | 12/2006 | Furuno et al. | |
| 2008/0145006 A1* | 6/2008 | Ice | G02B 6/4201 385/93 |
| 2008/0247713 A1 | 10/2008 | Tamura et al. | |
| 2009/0028557 A1* | 1/2009 | Togami | H04B 10/40 398/39 |
| 2009/0211801 A1* | 8/2009 | Edwards | H05K 9/0058 174/377 |
| 2009/0226130 A1 | 9/2009 | Doany et al. | |
| 2010/0098427 A1* | 4/2010 | Ice | G02B 6/4201 398/135 |
| 2011/0216998 A1 | 9/2011 | Symington et al. | |
| 2012/0148201 A1* | 6/2012 | Kondou | G02B 6/4245 385/92 |
| 2013/0071072 A1* | 3/2013 | Xie | G02B 6/4277 385/92 |
| 2013/0335993 A1 | 12/2013 | Yabe et al. | |
| 2014/0202755 A1* | 7/2014 | Ito | H05K 9/0018 174/359 |
| 2016/0231521 A1 | 8/2016 | Smith et al. | |
| 2017/0048015 A1* | 2/2017 | O'Daniel | G02B 6/4219 |

* cited by examiner

OPTICAL MULTICHANNEL TRANSMISSION AND/OR RECEPTION MODULE, IN PARTICULAR FOR HIGH-BITRATE DIGITAL OPTICAL SIGNALS

CROSS-REFERENCE TO RELATED APPLICATIONS

This application claims priority to European Patent Application No. 15 200 503.9 and German Utility Model Application No. 20 2015 106 860.3, both filed Dec. 16, 2015, the disclosures of which are hereby incorporated in their entirety by reference.

BACKGROUND OF THE INVENTION

Field of the Invention

The invention relates to an optical multichannel transmission and/or reception module, in particular for high-bitrate digital optical signals.

Description of Related Art

Multichannel optical transmission and/or reception modules generally have two interfaces: The electric signals to be sent come in, and if necessary additional control signals or management signals for the module come in and go out, through an electric interface. Obviously, the electric interface can also act as the power supply for the module. The module can process the electric signals coming into it in a predetermined way and can then feed the processed signals into a driver unit, which in turn feeds the respective electric channel signal to an assigned electro-optic transmission element, such as a semiconductor laser. The electro-optic transmission element converts the electric signal fed to it by the driver unit into a corresponding optical channel signal and then feeds that to an optical output port on the module, wherein the module's optical output ports form an optical interface. Similarly, the module's optical interface can have multiple optical input ports, and an optical signal fed to an optical input port is in turn fed to an assigned opto-electric reception element, which converts the optical signal into a corresponding electric signal. The received electric signal is fed to a booster unit that boosts the received electric signal and feeds it to one or more units downstream for further processing, such as clock-and-data recovery (CDR). The processed electric signals are then fed to the electric interface.

The electric interface can obviously also be configured to feed and receive control or management signals that are needed for the receiver path. The electric interface can also provide a separate power supply for the receiver path.

When developing a design for such a multichannel transmission and/or reception module, it is necessary to configure the optical paths between the output ports of the electro-optic transmission elements and the optical output ports of the module or between the optical input ports of the module and the optical input ports of the opto-electric receiving elements as simply as possible, to reduce signal loss and allow cost-effective manufacturing. It is already known how to generate optical paths through multiple optical waveguides, such as glass fibers, wherein the ends of the optical wave guides must be positioned precisely with respect to the positions of the respective ports on the transmission elements or reception elements. In addition, the waveguide ends are often connected to the respective ports on the transmission or reception elements using free optical path segments within which there is no channeling of the optical signals through a waveguide. This requires sealed housings for multichannel transmission and/or reception modules configured in that manner, which makes them more expensive to manufacture.

Optical paths created using optical waveguides are therefore generally designed to run as straight as possible, for the least possible dampening of the optical paths due to macrobending of the optical waveguides. Because optical multichannel transmission and/or reception modules are often configured so that they can be placed in respective insertion locations of superordinate communication devices as needed, most multichannel transmission and/or reception modules have a standardized housing, usually consisting of an oblong, essentially rectangular structure. The optic and electric interfaces are located on the shortest front sides. The electric interface is located on the front side that projects into the superordinate communication device. The respective external fiber-optic cables can then be connected to the optic interface on the opposite front side.

The housing of such an optical multichannel transmission and/or reception module can contain an assembly, such as a circuit board, on which all the components needed to transmit and receive the optical signals are located. In addition, this assembly can also include all other electric and/or electronic components needed to pre-process the (electric) signals to be transmitted and to control the electro-optic transmission elements that convert the pre-processed (electric) signals into the corresponding optical signals. The same also applies to the electric and/or electronic components needed for further processing of the electric signals received from the opto-electric reception elements (i.e., the optically/electrically converted optical reception signals).

This assembly or the related (usually printed) circuit board is generally placed lengthwise in the module housing. One end of the lengthwise-placed circuit board can therefore also serve as the location for connecting the electric interface.

In this arrangement, the electro-optic transmission elements or opto-electric reception elements are incorporated into the assembly in such a way that the optic waveguides run between the module's optic interface, which is generally an optical unit plugged into the appropriate module end, and the transmission or reception elements, generally in a straight line along the longitudinal axis of the housing or parallel to the plane of the assembly's printed circuit board.

It is also possible to incorporate this assembly into an opto-electric assembly (hereinafter called an opto-electric module) and a purely electric assembly. The opto-electric assembly includes the electro-optic transmission elements or opto-electric reception elements and, if necessary, other electric or electronic components such as driver units for the electro-optic transmission elements and electric booster units for the opto-electric reception elements, which should be positioned as close as possible to the transmission or reception elements. This opto-electric module is connected through an internal electric interface to the purely electric assembly that includes the additional components needed to pre-process or further process the respective electric signals.

US 2011/0216998 A1 describes an opto-electric sub-assembly in the form of an optic wafer, on which there are multiple optical paths in a transparent flat (even) substrate between the outer surfaces that lie opposite each other, wherein each optical path has surfaces that interface with the substrate's outer surfaces, which are positioned precisely with respect to corresponding reference markers. For positioning electro-optic transmission elements or opto-electric reception elements with respect to the interface surfaces of the optical paths, mechanical positioning means are provided that allow these elements to be positioned relative to the reference markers located on the related wafer surfaces. This makes it possible to position the optical output ports of the transmission element or the optical input ports of the receiving element precisely with respect to the interface surfaces of the respective associated optical paths. Similarly, mechanical positioning means are provided on the opposing wafer surfaces, allowing an optical multi-connector to be positioned with respect to the interface surfaces of the optical paths. These wafer surfaces also have reference markers, relative to which the interface surfaces of the optical paths are positioned. Aligning the mechanical positioning means, such as a matching ferrule in a multi-connector, relative to the reference markers also permits easy positioning of all waveguide ends relative to the interface surfaces of the optical paths.

This opto-electric subassembly therefore allows for easy coupling of multiple optical waveguide ends to electro-optic transmission elements or opto-electric reception elements, and in particular of multiple transmission elements or reception elements that can be configured as arrays. This prevents free optical path segments.

If such an opto-electric subassembly is used in making an opto-electric module for an optic multichannel transmission and/or reception module, that module could be connected to the purely electric assembly in the usual way, using a slot provided in the purely electric assembly. The flat opto-electric module would then be essentially perpendicular to the lengthwise plane of the purely electric assembly, which runs parallel to the longitudinal axis of the housing.

At the same time, this would make it possible for the optical waveguides to run essentially straight or with only slight bends between the respective input and output ports (i.e., the axes of the optical waveguides must bend only with relatively large bending radii and small wrap angles) when connecting the opto-electric module and the input or output port of the transmission and/or reception module. This results in a minimal optic waveguide length. In addition, the essentially straight path results in little or no additional damping due to macro-bends.

Because the dimensions of such an opto-electric module cannot be arbitrarily small, due to the dimensions of the required electro-optic transmission elements or opto-electric reception elements, the housing of such a multichannel optical transmission and/or reception module must have a height or clearance that is greater than the measurements of the flat opto-electronic module in the "flat" plane, if it is placed in that cross-section of the housing.

However, newer standards for optical multichannel transmission and/or reception modules, in particular modules for generating or receiving high-bitrate optical signals, provide for housings with ever smaller dimensions. Nonetheless, the integration of electric and opto-electric assemblies or modules in such small housings represents an ever more demanding task.

SUMMARY OF THE INVENTION

The invention is based on the task of producing an optical multichannel transmission and/or reception module having a housing with small outer dimensions, in particular a low height, but still with enough room for the required electric and opto-electric assemblies. In addition, free optical paths between the input ports or output ports of the module and the output ports of the electro-optic transmission elements or input ports of the opto-electric reception elements should be avoided, so that a hermetically sealed housing is not necessary.

The invention is based on the knowledge that by using an opto-electric module separated from an additional purely electric assembly, on or in which the multiple electro-optic transmission elements and/or multiple opto-electric reception elements are placed, with that module having an optical coupling area on one of its surfaces that is connected to the respective first ends of multiple optical waveguides, and having multiple optic paths for optical connection of each first end of an optic waveguide to an associated electro-optic transmission element and/or an associated opto-electric reception element, an optical multichannel transmission and/or reception module can be produced, in which free paths between the optical input ports and/or optical output ports of the housing and the multiple electro-optic transmission elements and/or multiple opto-electric reception elements are avoided.

Configuring the opto-electric module in a module plane that runs transversely to a longitudinal axis of the housing allows for a smaller design height of the housing, or allows such an opto-electric module to be enclosed in a housing whose design height is less than the expanse of the flat opto-electric module in its flat expansion plane.

More precisely, transverse arrangement of the opto-electric module allows the inner height of the housing (in a cross-section perpendicular to the longitudinal axis of the housing), in at least one axial area in which the opto-electric module is provided and in at least one plane out of all planes that lie perpendicular to an imaginary tilt axis of the opto-electric module, to be less than the lengthwise extent of the opto-electric module's cross-section in that plane. The imaginary tilt axis of the opto-electric module is therefore usually perpendicular to the longitudinal axis of the housing, so that the sides of an essentially rectangular module run parallel to the respective edges or surfaces of the housing, which is often likewise designed to be rectangular (at least in the area of the opto-electric module).

Selecting a suitable pivot angle (the relatively smaller angle between the longitudinal axis of the housing and the module plane) allows, first, a very small design height of the optical multichannel transmission and/or reception module and, second, a still relatively smaller wrap angle of the curvatures of the optical waveguides between the opto-electric module and the optical input or output ports of the housing and a large enough bending radius.

According to one embodiment of the invention, the electric assembly has a mounting plate for electric components that is placed parallel to the longitudinal axis of the housing and parallel to the imaginary tilt axis of the opto-electric module. The electric connection between an internal electric interface of the electric assembly and the opto-electronic module can therefore preferably be through a flexible circuit board, which in the module area can also serve as the mounting element for electric or electronic components. For this purpose, the flexible circuit board can be reinforced in an area where it is connected to the opto-electronic module. However, the flexible electric circuit board can also be configured only for electric contact with electric and/or opto-electric or electro-optic components that are included in the opto-electronic module as mounting elements.

According to one preferred embodiment of the invention, one or more electric driver units for the electro-optic transmission elements and/or one or more electric booster units for boosting the electric signals received by the opto-electric reception elements are also included in or on the opto-electric module. This offers the advantage that any components which are advantageously or must be in close proximity to the electro-optic transmission units or opto-electric reception units can be placed in that advantageous manner. This is especially necessary for high-bitrate optical multi-channel transmission and/or reception modules.

However, adding these components to the opto-electric module also increases the required size of the assembly. Without the invented transverse arrangement of the opto-electronic module in the housing, i.e., placement perpendicular to the longitudinal axis of the housing, this would require a correspondingly greater design height.

According to one preferred embodiment of the invention, the housing has an essentially rectangular structure, with the longitudinal axis of the housing running parallel to the longest sides of a corresponding rectangle. Such a housing can be, for example, a housing according to the various SFP standards, such as a housing according to the QSFP+ standard.

According to one embodiment of the invention, the opto-electric module is placed next to the electric assembly in the direction of the longitudinal axis of the housing, wherein the opto-electric module is advantageously placed adjacent to the optical transmission or reception ports of the housing.

According to the invention, the longitudinal axes of the housing and the module plane preferably have an angle α in the range of $20°\leq\alpha\leq50°$, or even more preferably in the range of $30°\leq\alpha\leq45°$. This represents a good or excellent compromise between the maximum required design height and the maximum required adjustment angle or minimum required bending radius for the optical waveguides that connect the opto-electric module to the optical input or output ports of the housing.

According to one embodiment of the invention, in one end area of the housing, preferably the end area of the housing in which the longest sides of the rectangular structure end, there can be a mounting element with one end facing the appropriate front side of the housing configured to accommodate an optical multi-plug unit and an opposite end configured for transverse support of the opto-electric module, wherein the optical coupling area of the opto-electric module is connected to the first ends of the optical waveguides and wherein the second ends of the optical waveguides are connected to the optical multi-plug unit.

This allows for simpler construction and therefore simpler assembly of the individual components of the optical transmission and/or reception module.

The mounting element can have two arms running essentially parallel to the longest sides of the rectangular structure, to which the opto-electric module is attached, wherein the optical coupling area is located in a free space between the two arms and the optical waveguides run into that space.

According to the invention, the opto-electric module can be configured such that the first ends of the optical waveguides are connected perpendicularly to the coupling area of the opto-electric module, preferably by means of a multi-ferrule, in which the ends of the optical waveguides are secured in a defined position relative to each other. This results in a simple configuration of the opto-electronic module and simple connection of the optical waveguides.

According to one embodiment of the invention, the second ends of the optical waveguides run parallel to the longitudinal axis of the housing and are secured in the optical multi-plug unit in a defined position relative to each other, preferably through a multi-ferrule.

According to one embodiment of the invention, the optical waveguides can be configured as bend-insensitive glass fibers with low macro-bend sensitivity in the applicable wavelength range, preferably additional attenuation of 0.3 dB or less for a bending radius of 5 mm and a wrap angle of 360°.

As is normal for the state of the art, in the end area of the housing that is opposite to the end area with the optical multi-plug unit, there can be a purely electric plug assembly with multiple electric contacts, wherein the electric contacts are preferably integrated into the mounting plate.

According to one preferred embodiment of the invention, the optical transmission and/or reception module is configured as a transceiver module, with multiple electro-optic transmission elements and an electric driver unit as well as multiple opto-electric reception elements and an electric booster unit for that purpose, wherein the housing preferably has a standardized form factor, in particular according to the QSFP (Quad Small Form-Factor Pluggable) and the QSFP+ (Quad Small Form-Factor Pluggable plus) standards.

BRIEF DESCRIPTION OF THE DRAWINGS

The invention is described below in relation to an exemplary embodiment illustrated in the drawing.

DETAILED DESCRIPTION OF THE INVENTION

Figure 1:
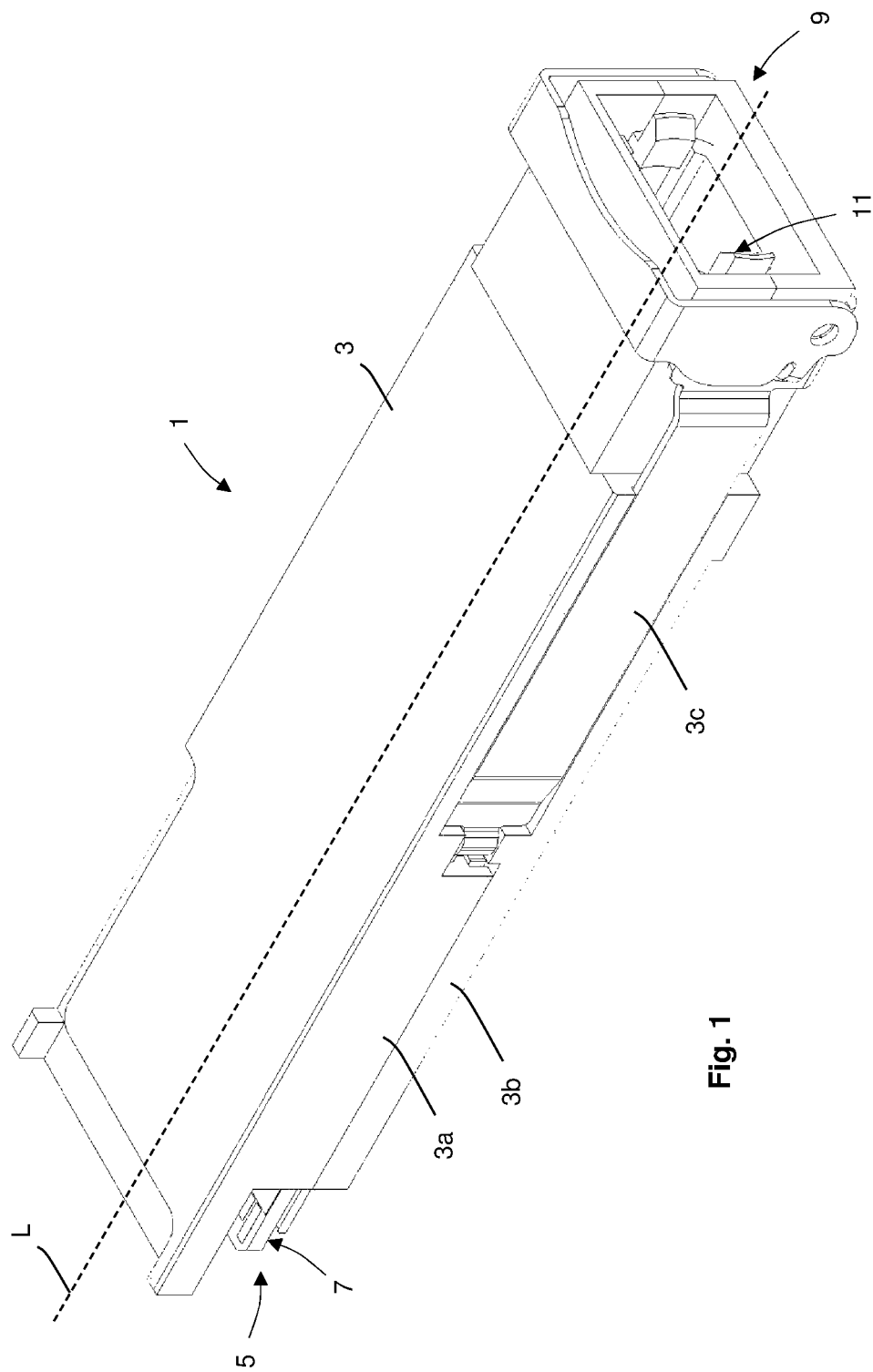
FIG. 1 is a perspective view of an optical multichannel transmission and/or reception module according to the invention.

FIG. 1 shows an optical multichannel transmission and/or reception module 1, having a housing 3 that generally corresponds to standardized specifications. This can be, for example, a housing according to the CFP or SFP standards, in particular according to the SFP+ standard.

The housing 3 has a lengthwise structure and, as shown in FIG. 1, can have an essentially long rectangular shape. The housing has a longitudinal axis L running in its lengthwise expansion direction.

The optical transmission and/or reception module 1 or the housing 3 are configured such that they can be inserted into suitable plug-in or insertion sockets of a superordinate component or device, such as a device implementing a central node (CN) or remote node (RN) of a passive optical network (PON).

For this purpose, the optical transmission and/or reception module 1 has an electric interface 5 provided at the rearward end of the housing 3, which is configured as an electric plug assembly 7. The rearward end of the housing 3 thus forms the means for mechanically guiding or centering and securing the plug assembly 7 in a matching complementary plug assembly on the superordinate component or device (not shown).

In addition, the optical transmission and/or reception module has an optical interface 9 provided at the forward end of the housing 3, which is configured as an optical plug assembly 11. The optical plug assembly is configured as a multi-plug assembly, so that multiple optical waveguides (not shown) for the multiple optical channels can be connected to the optical transmission and/or reception module. The optical plug assembly 11 defines optical input and/or output ports of the optical transmission and/or reception module 1.

This means that an individual optical channel can be realized with each optical waveguide. The respective optical reception signal, which is received by the optical transmission and/or reception module 1, and the optical transmission signal, which is sent by the optical transmission and/or reception module 1, can therefore be routed in the same optical waveguide. Normally, different wavelengths are used for the optical reception signal and the optical transmission signal. However, it is also possible for these signals to use the same wavelengths, if signal distortions due to reflected or backscattered signal portions can be prevented or tolerated up to a permissible threshold. It is also possible, however, for the optical reception signal and the optical transmission signal each to use dedicated optical waveguides. Also, in this case, either different optical wavelengths or identical wavelengths can be used for the optical reception signal and the optical transmission signal.

It is also possible for one or more of the optical waveguides to carry multiple optical reception signals and/or optical transmission signals in the form of an optical multiplex reception signal or an optical multiplex transmission signal. In this case, the optical transmission and/or reception module 1 must have one or more suitable demultiplexers and/or multiplexers in order to demultiplex the optical reception signal or multiplex the optical transmission signal.

The front end of the housing 3 also forms the means for the optical plug assembly 11, capable of mechanically guiding or centering and securing an optical multi-plug in the housing 3 (not shown). The multi-plug can be, for example, a multifiber push-on (MPO) or MTP (mechanical transfer push-on) plug, the latter having better optical and mechanical qualities than the MPO. Unlike the MPO plug, an MTP plug consists of a housing and a separate mechanical transfer (MT) ferrule. The MT ferrule is a multi-ferrule for optical waveguides, in which the orientation of the optical waveguides depends upon the eccentricity and positioning of the optical waveguides as well as the centering pin boreholes. The orientation of the optical waveguides is then controlled by the centering pins during the process of insertion into the plug assembly.

As can be seen in the figures, the housing 3 can be configured with multiple sections in the exemplary embodiment shown. In the embodiment of a housing 3 shown, the housing 3 consists of a housing top 3a, a housing bottom 3b, and two side sections 3c.

Figure 2:
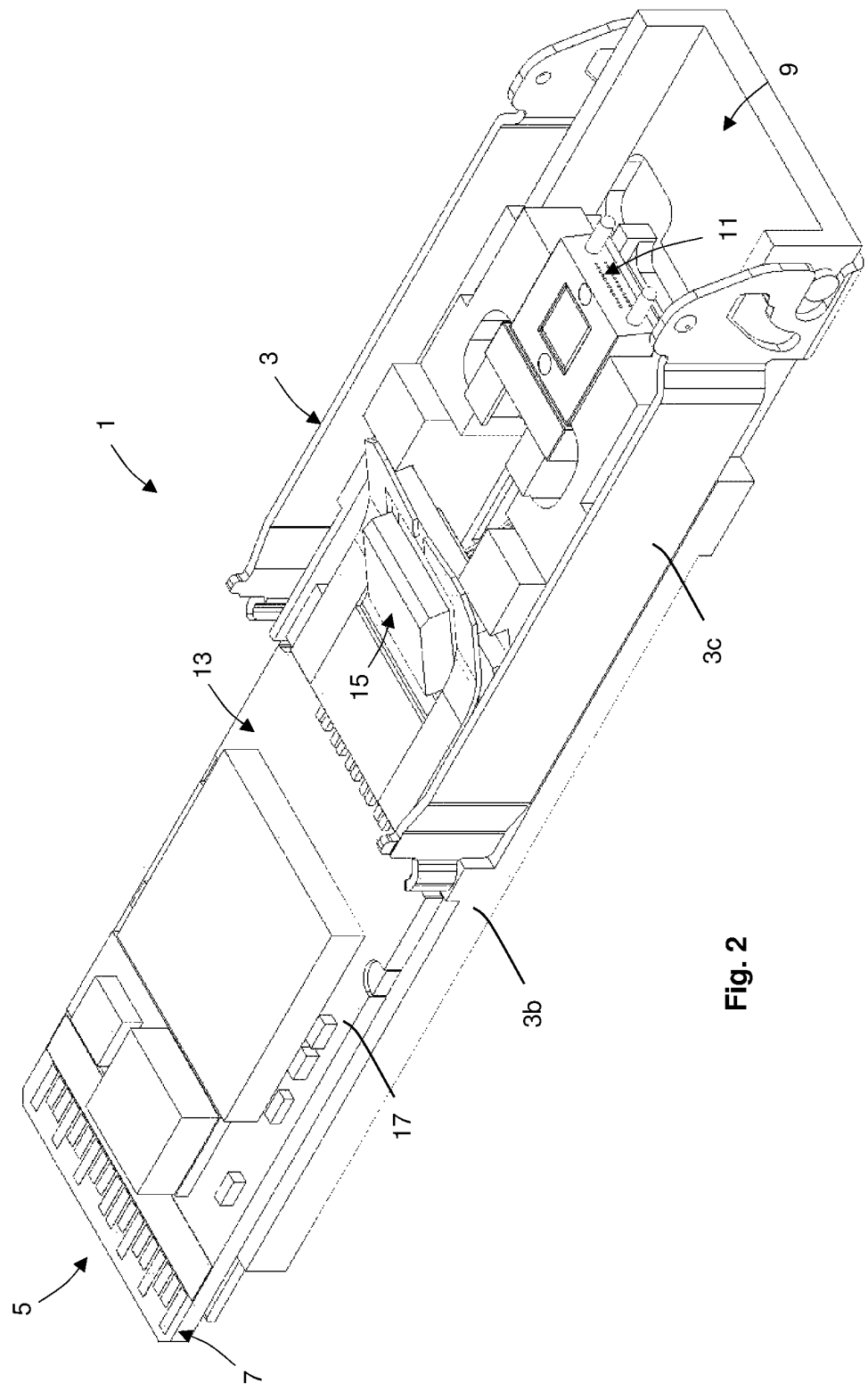
FIG. 2 is a perspective view of the optical multichannel transmission and/or reception module in FIG. 1 with the housing open.

FIG. 2 shows the optical transmission and/or reception module 1 with the housing open, i.e., without the housing top 3a. In the exemplary embodiment shown, an electric assembly 13 and a flat opto-electric module 15 are located in the housing 3 of the optical transmission and/or reception module 1 next to the optical plug assembly 11. The electric assembly 13 is preferably a mounting plate or circuit board 17, on which multiple purely electric or electronic components for processing electric signals are located. The electric signals can be any electric signals whose information content, in the form of appropriately electro-optically converted optical transmission signals, is delivered through the plug assembly 11 to the respective optical waveguides or which are necessary for controlling components located on the assembly 13 and/or the opto-electric module 15. Similarly, the electrical signals can be any signals that contain information content from the optical reception signals.

The opto-electric module 15 contains opto-electric reception elements, in the form of photodiode arrays, for example, as well as electric booster units, such as transimpedance boosters, for boosting the optical-electrically converted reception signals, and/or electro-optic transmission elements, such as laser-diode arrays, and one or more electric driver units for the electro-optic transmission elements. Placing the electric driver units close to the electro-optic transmission elements, or the booster units close to the opto-electric reception elements, prevents long signal paths and possible related impairment of the respective signals.

In addition, separating the reception elements and transmission elements as well as the directly correlated electric units results in a modular construction, so that the same type of a purely electric assembly 13 can be combined with different types of opto-electric modules 15, which may have, for example, different numbers of transmission elements and/or reception elements or differently configured transmission elements, in particular with respect to the wavelengths used for the optical transmission signals to be generated.

Figure 4:
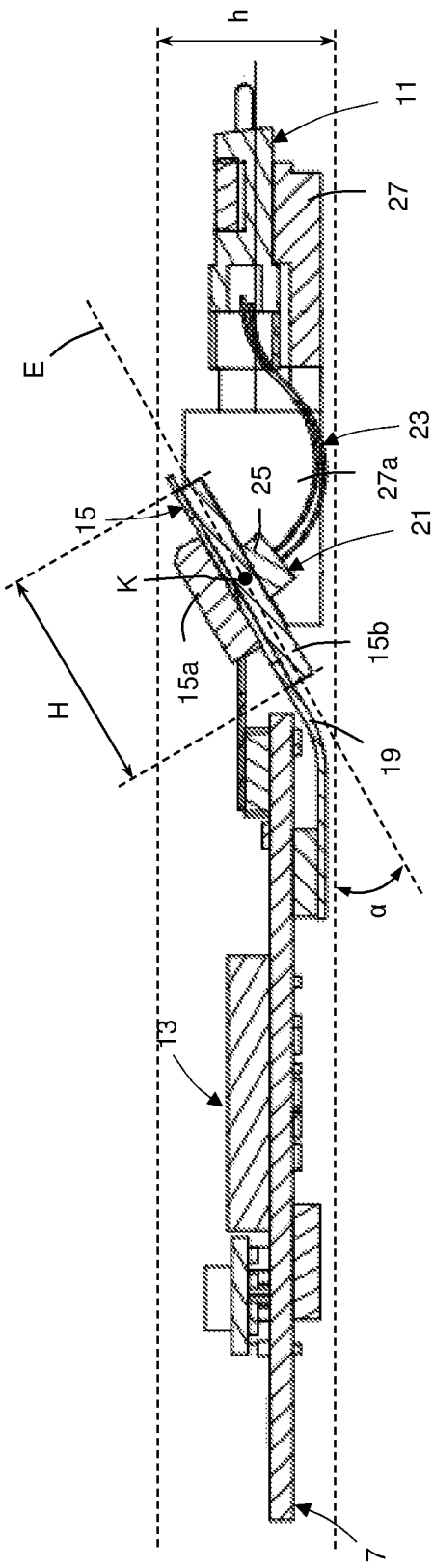
FIG. 4 is a cross-section through the components in FIG. 2 in the lengthwise central plane A.

The opto-electric module 15 is connected through an electric interface to a corresponding electric interface on the purely electric assembly 13. This connection can be through a flexible ribbon cable 19, for example. As in the embodiment shown, the flexible ribbon cable 19 can also be connected solidly to the opto-electric module 15. The part of the ribbon cable connected to the opto-electric module 15 can also be configured to be more rigid than the usual part or usual area of the ribbon cable 19. This more rigid area of the ribbon cable 19 can then serve as a circuit board, on which the corresponding conductor paths for contacting and switching the electric or electronic components provided on the opto-electric module 15 or the opto-electric reception elements and electro-optic transmission elements can be located. These components are shown in FIG. 4 as a section 15a of the opto-electric module 15. The individual components can also be hermetically sealed against the environment using a sealing compound.

Figure 3:
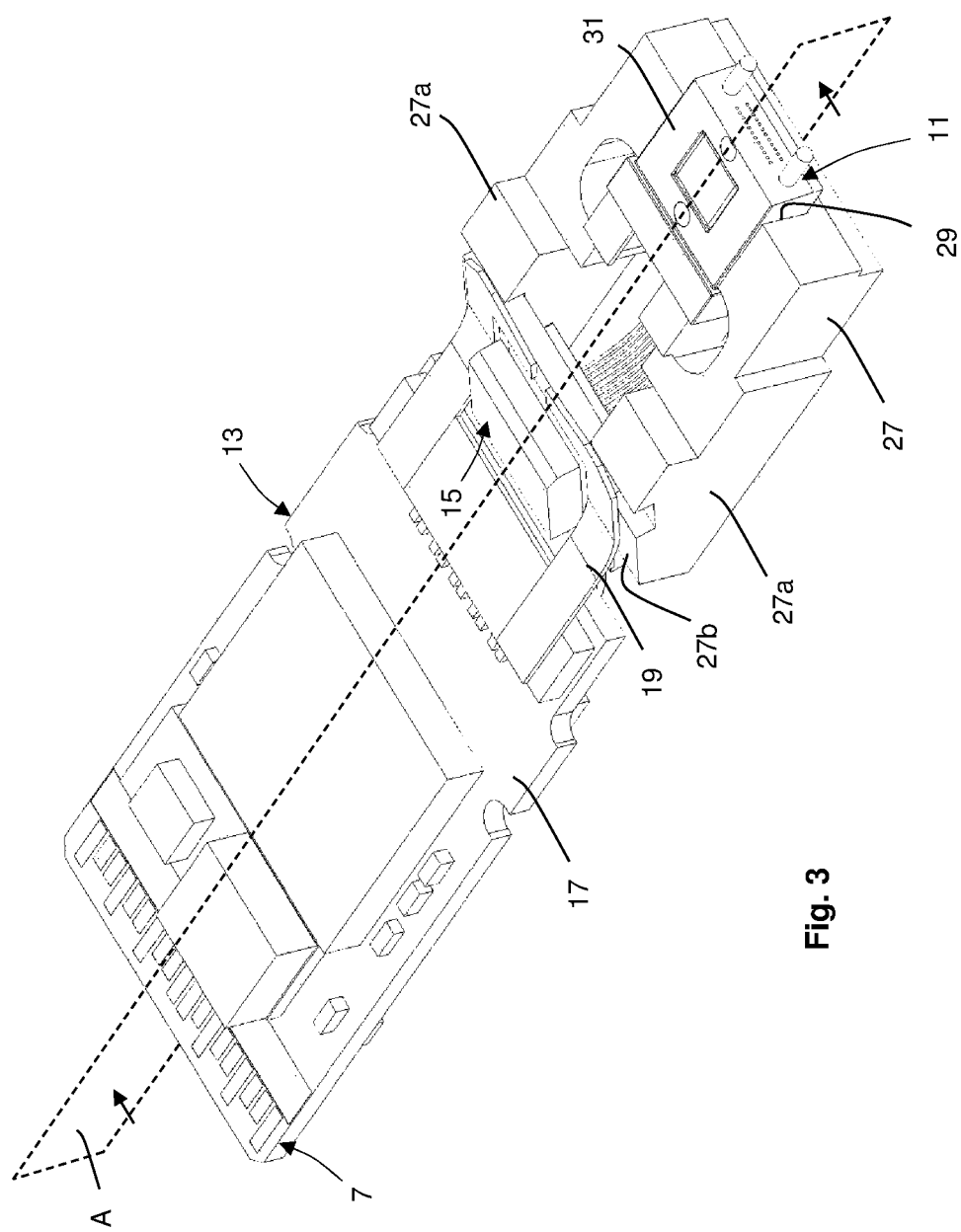
FIG. 3 is a perspective view of the essential components of the optical multichannel transmission and/or reception module in FIG. 1, as they are contained in its housing.

As can be seen in FIGS. 3 and 4, the aforementioned components are located on one of the two (larger) surfaces of a substrate 15b of the opto-electric module 15. On the opposite second (larger) surface of the substrate 15b, an optical multi-connector assembly 21 for multiple optical waveguides 23 is connected to the substrate 15b. The connection can be separable or fixed, with adhesive for example. Here the multi-connector assembly 21 can include a multi-ferrule 25, as is also used for optical multi-plugs.

The optical multi-connector assembly 21 or the multi-ferrule 25 is configured so that the ends of the optical waveguides 23 secured in it are essentially perpendicular to the preferably right-angular surfaces of the flat substrate 15b. Of course it is also possible for the axes of the waveguides 23 to be connected to the substrate 15b at a small angle deviating a few degrees from the perpendicular.

The substrate 15b includes multiple optical paths, which connect second optical ports located on the second surface of the substrate 15b to first optical ports located on the first surface of the substrate 15b. The optical multi-connector assembly 21 is configured such that each front side of the optical waveguides 23 faces one of the second optical ports, resulting in an optical connection with low enough attenuation.

The electro-optic transmission elements located on the first surface of the substrate 15b are configured such that the optical signals they generate are emitted in a direction perpendicular to the surface of the substrate 15b. The electro-optic transmission elements are positioned such that each of their output ports faces one of the first optical ports of the substrate 15*b*. This positioning must obviously be precise enough that there is acceptably low attenuation of the optical transmission signals. The optical transmission elements can in particular be Vertical Cavity Surface Emitting Laser (VCSEL) diodes, in particular VCSEL arrays.

Similarly, the electro-optic reception elements located on the first surface of the substrate 15*b* are positioned such that each of their photosensitive surfaces faces one of the first optical ports of the substrate 15*b*.

The optical connections between the substrate 15*b* and the opto-electric reception elements or electro-optic transmission elements thereby have no free optical expansions. There is therefore no danger of the optical signals being disrupted, or in particular attenuated, due to soiling of the opposing surfaces of the transmission elements or reception elements and the first or second ports. The term "soiling" also includes water droplets or a water layer that could be deposited on the related surfaces due to water vapor contained in the surroundings atmosphere when the dew-point is exceeded.

Reflections can best be avoided by covered connections, using transparent adhesive, for example, that have essentially the same refractive index as the optical waveguides 23 or the optical paths located in the substrate 15*b*.

The substrate 15*b* can basically be configured such that there are branching optical paths for optical splitters or combiners. It is also possible to integrate additional optical units or functions into the substrate 15*b* or along the optical paths, such as optical multiplexers or demultiplexers, circulators, or isolators.

In the most basic case, the optical paths can be configured such that exactly one optical path runs between each first and second port. This optical path can then preferably be assigned to an optical reception signal or an optical transmission signal, i.e., each to only one transfer direction. In this case, obviously, each of the optical waveguides 23 is also assigned only to one transfer direction.

As can be seen in FIGS. 3 and 4, the optical waveguides 23 define optical paths between the multi-connector assembly 21 and the optical plug assembly 11 of the optical multichannel transmission and/or reception module 1.

Referring to the embodiment of the flat opto-electric module 15, it would be best to configure the opto-electric module 15 with its module plane E perpendicular to the longitudinal axis L of the optical multichannel transmission and/or reception module 1, so as to minimize bends in the optical waveguides 23 or in the optical paths defined by them. This is because such bends, with a decreasing bend radius and increasing wrap angle, lead to an increase in the optical attenuation caused by these paths. Given the configuration of the optical plug assembly 11, which can be seen in FIG. 4, in which the optical axes of the ends of the optical waveguides 23 secured in them run parallel to the longitudinal axis L, perpendicular placement of the opto-electric module 15 could allow the optical waveguides 23 to run straight along their entire lengths.

In practice, however, a known minimum dimension of the opto-electric module 15 in the module plane E is needed. These minimum dimensions are defined by the number of optical paths required and in particular by the quantity and dimensions of the electro-optical transmission elements and opto-electric reception elements, as well as the driver units and booster units assigned to them. However, given the increasingly higher requirements for the maximum size of such an optical multichannel transmission and/or reception module 1, the problem arises that the opto-electric module 15 configured in such a way has dimensions in the module plane E that are larger than the corresponding inner dimensions of the housing 3, i.e., the applicable dimensions in cross-section planes (perpendicular to the longitudinal axis L) of the housing 3, at least in the respective axial area of the housing 3 in which the opto-electric module 15 should be located.

Thus, in the embodiment of an optical multichannel transmission and/or reception module 1 shown in the figures, the opto-electric module is placed transversely to the longitudinal axis L of the housing 3. This makes it possible to accommodate an opto-electric module 15 in the housing 3 which, in the relative axial cross-section of the housing 3 in at least one out of all the planes that lie perpendicular to an imaginary tilt axis K, has a clearance h (i.e., a smaller inner height or smaller distance of the respective inner walls of the housing perpendicular to the longitudinal axis L) that is smaller than the expanse of the flat opto-electric module 15 when fully assembled. In other words, the expanse of the opto-electric module 15 at the line where the module plane intersects with the respective plane that runs perpendicular to the tilt axis K is greater than the clearance of the housing in that plane (in the respective cross-section).

In the embodiment shown in FIG. 4 of a rectangular housing with an essentially constant inner height or clearance h, the opto-electric module 15 is placed in the housing 3 tilted on a tilt axis K that runs perpendicular to the longitudinal axis L. The opto-electric module 15 has the expanse or length H in the module plane. The module plane containing the opto-electric module 15 is tilted at an angle α with respect to the longitudinal axis L. The angle α lies preferably in the range of $20° \leq \alpha \leq 50°$, or even more preferably in the range of $30° \leq \alpha \leq 45°$. The upper and lower inner walls of the housing are indicated here by dashed lines above and below the opto-electric module 15 or the components inside the housing.

As can be seen in FIG. 4, the electric assembly 13 or its circuit board 17 is located on a plane that runs parallel to the longitudinal axis L and to the tilt axis K or is spanned by the directional vectors of those axes.

Through the use and inclined placement of an opto-electric module 15 configured in such a way, it is possible, as previously stated, to have no free optical path segments in the optical path between the optical plug assembly 11 and the opto-electric reception elements or electro-optical transmission elements, so that a hermetically sealed housing 3 is not necessary and instead a housing 3 can be used whose inner height in the area of the opto-electric module 15 is less than the expanse of the opto-electric module 15 in the module plane.

This is paid for with an optical path that is acceptably bent, defined by the optical waveguides 23. To prevent unacceptably high attenuations, special bending-insensitive waveguides or glass fibers are used for the optical waveguides 23. In addition, preferably an optimal compromise between the inclination or tilt of the opto-electric module 15 and the resulting bending of the optical path of the waveguides 23 is also sought.

As shown in the figures, a U-shaped mounting element 27 is provided for holding a plug unit 31 on the plug assembly 11 in the front area of the housing 3, which has two arms 27*a* that extend in the direction of the longitudinal axis L. In the front area, the mounting element 27 has a cutout 29 in which a multi-ferrule that forms the plug unit 31 is inserted and secured.

The end areas of the arms have transverse surfaces 27*b* that are used to support and secure the flat opto-electric module 15. In the surfaces 27b, as shown in FIG. 3, there can also be cutouts to hold the multi-ferrule or plug unit 31, if it is wider than the distance between the arms 27a. This allows the module 15 to be better attached or secured. Securing can also be ensured by corresponding clamp elements provided on the inner wall of the upper section of the housing, so that when the housing is assembled the module 15 is fixed in its tilted position. The other components such as the electric assembly 13 and the plug assembly 11 can also be secured in the housing in the same manner.

However, other attachment or securing means are also possible, such as screwing, gluing, or snapping the components in.

As shown in FIGS. 3 and 4, the optical waveguides 23 run through the area between the two arms 27a. This leaves enough space to install the waveguides 23 with the greatest possible bending radii and the smallest possible wrap angle.

LIST OF DRAWING REFERENCES

1 Optical multichannel transmission and/or reception module
3 Housing
3a Housing upper section
3b Housing lower section
3c Side section
5 Electric interface
7 Electric plug assembly
9 Optical interface
11 Optical plug assembly
13 (Purely) electric assembly
15 Opto-electric module
15a Section of the opto-electric module with electro-optic transmission elements and opto-electric reception elements as well as electric booster units and electric driver units
15b Substrate
17 Circuit board
19 Ribbon cable
21 Multi-connector assembly
23 Optical waveguides
25 Multi-ferrule
27 Mounting element
27a Arms
29 Cutout
31 Plug unit (multi-ferrule)
L Longitudinal axis
A Lengthwise central plane
E Module plane
K Tilt axis

The invention claimed is:

1. An optical multichannel transmission and/or reception module, in particular for high-bitrate digital optical signals, comprising
a housing having multiple optical input ports and/or optical output ports and containing an electric assembly and an essentially flat opto-electric module connected electrically to the electric assembly,
wherein multiple electro-optic transmission elements and/or multiple opto-electric reception elements are located on or in the opto-electric module,
wherein the opto-electric module has an optical coupling area on one of its surfaces that is connected to the respective first ends of multiple optical waveguides, and wherein the opto-electric module has multiple optic paths for optical connection of each first end of an optical waveguide with an assigned electro-optic transmission element and/or an associated opto-electric reception element,
wherein the first ends of the optical waveguides are connected perpendicularly to the coupling area of the opto-electric module,
wherein the opto-electric module is located in a module plane that runs transversely to a longitudinal axis of the housing,
wherein the longitudinal axes of the housing and a module plane have an angle α in a range of $20°≤α≤50°$, preferably in a range of $30°≤α≤45°$, and
wherein an inner height of the housing, in at least one axial area in which the opto-electric module is provided and in at least one plane out of all planes that lie perpendicular to an imaginary tilt axis of the opto-electric module, is less than a lengthwise extent of the opto-electric module's cross-section in that plane.

2. The optical transmission and/or reception module of claim 1, wherein the electric assembly has a mounting plate for electric components that is placed on or parallel to the longitudinal axis of the housing and parallel to the imaginary tilt axis of the opto-electric module.

3. The optical transmission and/or reception module of claim 1, wherein one or more electric driver units for the electro-optic transmission elements and/or one or more electric booster units for boosting the electric signals received by the opto-electric reception elements are also included in or on the opto-electric module.

4. The optical transmission and/or reception module of claim 1, wherein the housing has an essentially rectangular structure, with the longitudinal axis of the housing running parallel to the longest sides of a corresponding rectangle.

5. The optical transmission and/or reception module of claim 1, wherein the tilt axis of the opto-electric module runs perpendicular to the longitudinal axis of the housing.

6. The optical transmission and/or reception module of claim 1, wherein the opto-electric module is placed in the direction of the longitudinal axis of the housing next to the electric assembly.

7. The optical transmission and/or reception module of claim 1, wherein the mounting element has two arms running essentially parallel to the longest sides of the rectangular structure, to which the opto-electric module is attached, and wherein the optical coupling area is located in a free space between the two arms and the optical waveguides run into that free space.

8. The optical transmission and/or reception module of claim 1, wherein the first ends of the optical waveguides are connected to the coupling area of the opto-electric module through a multi-ferrule in which the ends of the optical waveguides are fixed in a defined position relative to each other.

9. The optical transmission and/or reception module of claim 1, wherein the optical waveguides are configured as glass fibers with low macro-bend sensitivity in the applicable wavelength range, preferably additional attenuation of 0.3 dB or less for a bending radius of 5 mm and a wrap angle of 360°.

10. The optical transmission and/or reception module of claim 1, wherein it is configured as a transceiver module, with multiple electro-optic transmission elements and one or more electric driver units as well as multiple opto-electric reception elements and one or more electric booster units for that purpose, and wherein the housing has a standardized form factor, in particular according to the QSFP (Quad Small Form-Factor Pluggable) or the QSFP+ (Quad Small Form-Factor Pluggable plus) standards.

11. The optical transmission and/or reception module of claim 4, wherein in one end area of the housing, preferably the end area of the housing in which the longest sides of the rectangular structure end, there is a mounting element with one end facing the appropriate front side of the housing configured to accommodate an optical multi-plug unit and the opposite end configured for transverse support of the opto-electric module, wherein the optical coupling area of the opto-electric module is connected to the first ends of the optical waveguides and wherein the second ends of the optical waveguides are connected to the optical multi-plug unit.

12. The optical transmission and/or reception module of claim 11, wherein the second ends of the optical waveguides run through the optical multi-plug unit parallel to the longitudinal axis of the housing and are secured in a defined position relative to each other, preferably by a multi-ferrule.

13. The optical transmission and/or reception module of claim 11, wherein in the end area of the housing that is opposite to the end area with the optical multi-plug unit, there is a purely electric plug assembly with multiple electric contacts, wherein the electric contacts are preferably integrated into the mounting plate.

* * * * *